(12) United States Patent
Fujimoto (10) Patent No.: US 12,253,108 B2
(45) Date of Patent: *Mar. 18, 2025

(54) MOTOR (71) Applicant: MINEBEA MITSUMI Inc., Nagano (JP)

(72) Inventor: Seiya Fujimoto, Nagano (JP)

(73) Assignee: MINEBEA MITSUMI Inc., Nagano (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/401,997

(22) Filed: Jan. 2, 2024

(65) Prior Publication Data

US 2024/0133424 A1 Apr. 25, 2024

Related U.S. Application Data (63) Continuation of application No. 17/651,842, filed on Feb. 21, 2022, now Pat. No. 11,892,033.

(30) Foreign Application Priority Data

Feb. 26, 2021 (JP) .................................. 2021-031028

(51) Int. Cl.
*F16C 17/08* (2006.01)
*H02K 5/173* (2006.01)

(52) U.S. Cl.
CPC ........... *F16C 17/08* (2013.01); *H02K 5/1732* (2013.01)

(58) Field of Classification Search
CPC .............................. F16C 17/08; H02K 5/1732
See application file for complete search history.

(56) References Cited

U.S. PATENT DOCUMENTS

| 11,892,033 B2* | 2/2024 | Fujimoto ............... F16C 33/723 |
| 2006/0108883 A1* | 5/2006 | Yeh ....................... H02K 5/1675 310/85 |
| 2012/0032542 A1 | 2/2012 | Liu et al. |
| 2018/0278116 A1 | 9/2018 | Kitamura et al. |

FOREIGN PATENT DOCUMENTS

| JP | H05-49199 A | 2/1993 |
| JP | H06-28938 Y2 | 8/1994 |
| JP | H07-39263 U | 7/1995 |
| JP | 2001-157407 A | 6/2001 |
| JP | 2018-198503 A | 12/2018 |

OTHER PUBLICATIONS

First Office Action dated Sep. 11, 2024 for corresponding Japanese Application No. 2021-031028 and English translation.
Second Office Action dated Dec. 4, 2024 for corresponding Japanese Application No. 2021-031028 and English translation.

* cited by examiner

*Primary Examiner* — Terrance L Kenerly
(74) *Attorney, Agent, or Firm* — Chrisman Gallo Tochtrop LLC (57) ABSTRACT

A motor according to the present application includes a rotating shaft, a bearing, a bearing holder configured to accommodate the bearing, a holder disposed at one end portion side of the bearing holder in a rotating shaft direction, and a lid disposed at another end portion side of the bearing holder in the rotating shaft direction. A labyrinth structure is formed of one end portion of the bearing holder and an inner peripheral portion of the holder, and/or a labyrinth structure is formed of the rotating shaft and the lid.

3 Claims, 5 Drawing Sheets

MOTOR

CROSS-REFERENCE TO RELATED APPLICATIONS

This application is a continuation of U.S. application Ser. No. 17/651,842 filed on Feb. 21, 2022, and claims the benefit of priority to Japanese Application No. JP2021-031028, filed Feb. 26, 2021, the entire disclosure of which is hereby incorporated herein by reference.

TECHNICAL FIELD

The present invention relates to a motor.

BACKGROUND ART

A motor has conventionally been used as a drive source of various devices. For example, Patent Document 1 discloses an outer rotor-type motor including a bearing capable of being preloaded disposed inside a bearing holder.

CITATION LIST

Patent Literature

Patent Document 1: JP 2001-157407 A

SUMMARY OF INVENTION

Technical Problem

In a case where a motor is used outside and the like, for example, when dust enters the motor, there is a concern that the dust may affect driving components. The effect may prevent prolongation of the life span of the motor on a long-term basis.

An object of the present invention is to provide a motor having improved dust resistance.

Solution to Problem

A motor according to the present invention includes: a rotating shaft; a bearing; a bearing holder configured to accommodate the bearing; a holder disposed at one end portion side of the bearing holder in a rotating shaft direction; and a lid disposed at another end portion side of the bearing holder in the rotating shaft direction, wherein a labyrinth structure is formed of one end portion of the bearing holder and an inner peripheral portion of the holder, and/or a labyrinth structure is formed of the rotating shaft and the lid.

In the motor according to one embodiment of the present invention, the labyrinth structure is formed of the one end portion of the bearing holder and the inner peripheral portion of the holder, the inner peripheral portion of the holder is fixed to the rotating shaft, the holder includes a wall portion protruding in the rotating shaft direction, the one end portion of the bearing holder includes a wall portion protruding in the rotating shaft direction, and the wall portion of the holder and the wall portion of the bearing holder located inside the wall portion of the holder oppose each other in a radial direction.

In the motor according to one embodiment of the present invention, the labyrinth structure is formed of the rotating shaft and the lid, the lid includes a wall portion protruding in the rotating shaft direction, and an outer peripheral surface of the rotating shaft and the wall portion of the lid oppose each other in the radial direction.

In the motor according to one embodiment of the present invention, the wall portion of the lid urges the bearing in the rotating shaft direction.

In the motor according to one embodiment of the present invention, an inner peripheral surface of the other end portion of the bearing holder is screwed to an outer peripheral surface of the lid.

DESCRIPTION OF EMBODIMENTS

Overview of Embodiment

First, an overview of representative embodiments of the invention disclosed in the present application will be described. Note that, in the following description, reference signs in the drawings corresponding to the constituent elements of the invention are mentioned in parentheses as an example.

[1] A motor (1) according to the representative embodiment of the present invention includes a rotating shaft (172), a bearing (19), a bearing holder (111) configured to accommodate the bearing (19), a holder (17) disposed at one end portion (111a) side of the bearing holder (111) in a rotating shaft direction, and a lid (113) disposed at another end portion (111b) side of the bearing holder (111) in the rotating shaft direction. A labyrinth structure is formed of one end portion (111a) of the bearing holder (111) and an inner peripheral portion (171) of the holder (17), and/or a labyrinth structure is formed of the rotating shaft (172) and the lid (113).

[2] The labyrinth structure is formed of the one end portion (111a) of the bearing holder (111) and the inner peripheral portion (171) of the holder (17), the inner peripheral portion (171) of the holder (17) is fixed to the rotating shaft (172), the holder (17) includes a wall portion (17w) protruding in the rotating shaft direction, the one end portion (111a) of the bearing holder (111) includes a wall portion (111w) protruding in the rotating shaft direction, and the wall portion (17w) of the holder (17) and the wall portion (111w) of the bearing holder (111) located inside the wall portion (17w) of the holder (17) oppose each other in a radial direction.

[3] The labyrinth structure is formed of the rotating shaft (172) and the lid (113), the lid (113) includes a wall portion (113w) protruding in the rotating shaft direction, and an outer peripheral surface (172o) of the rotating shaft (172) and the wall portion (113w) of the lid (113) oppose each other in the radial direction.

[4] The wall portion (113w) of the lid (113) urges the bearing (19) in the rotating shaft direction.

[5] An inner peripheral surface (111bi) of the other end portion (111b) of the bearing holder (111) is screwed to an outer peripheral surface (113o) of the lid (113).

Figure 1:
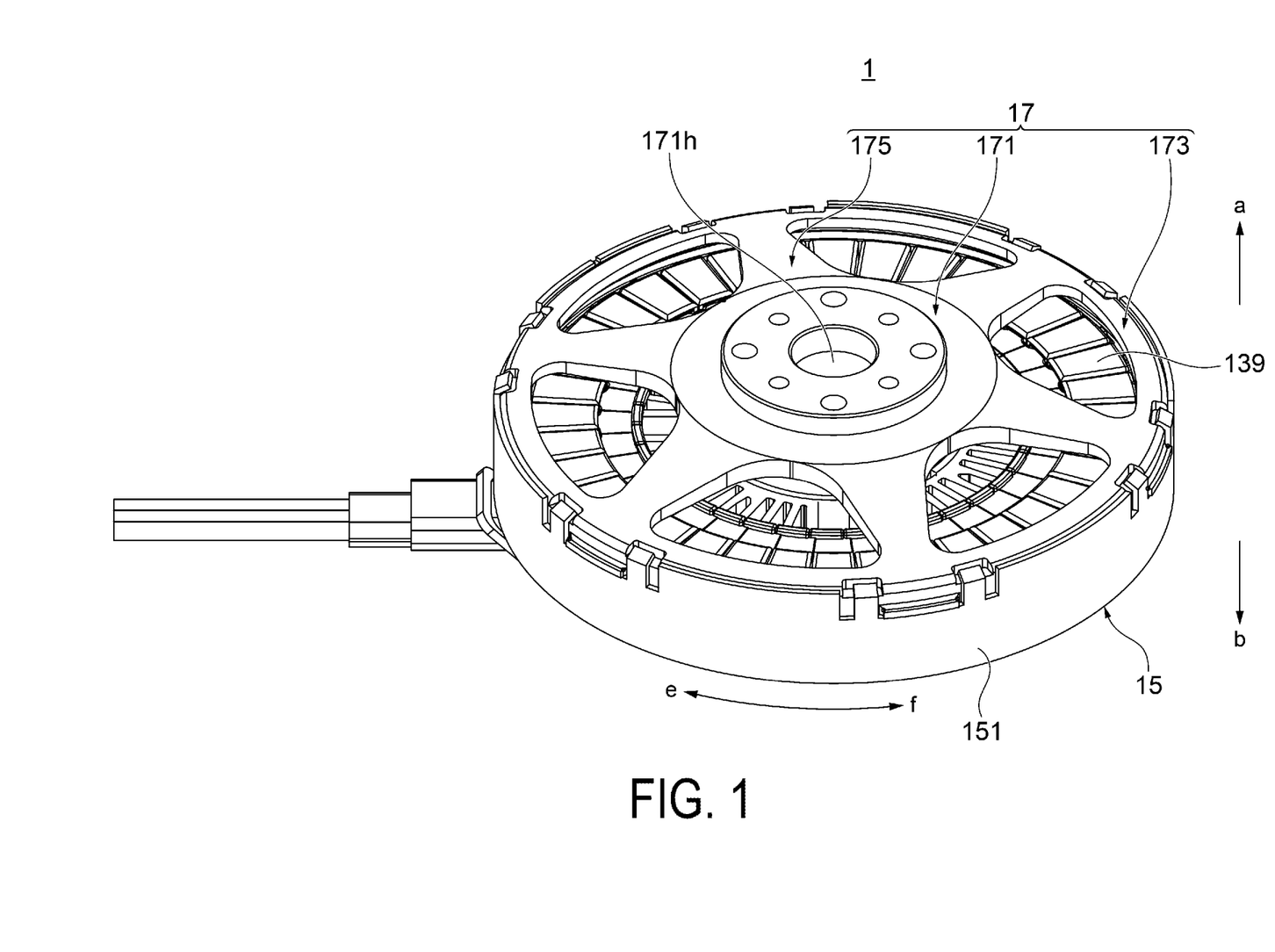
FIG. 1 is a perspective view illustrating an overall configuration of an outer rotor-type motor according to one embodiment of the present invention.
Figure 2:
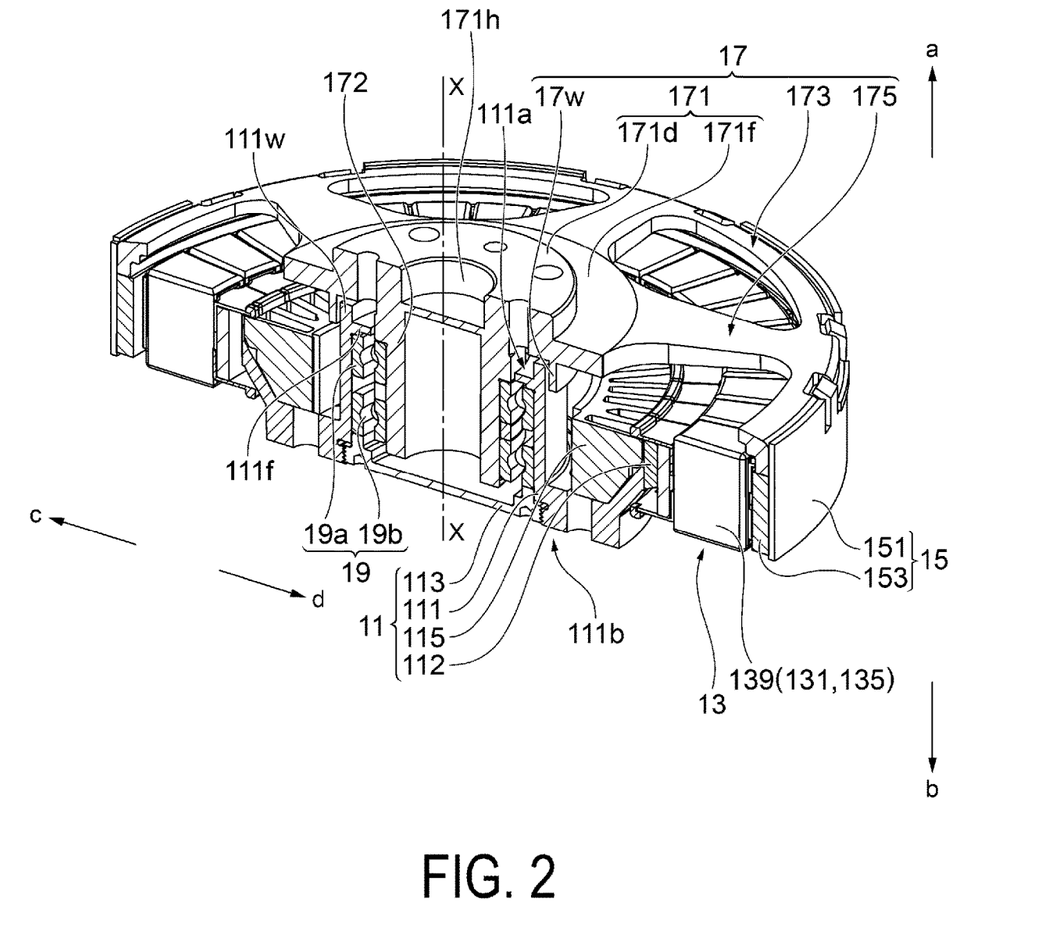
FIG. 2 is a cross-sectional perspective view of the motor according to one embodiment of the present invention.
Figure 3:
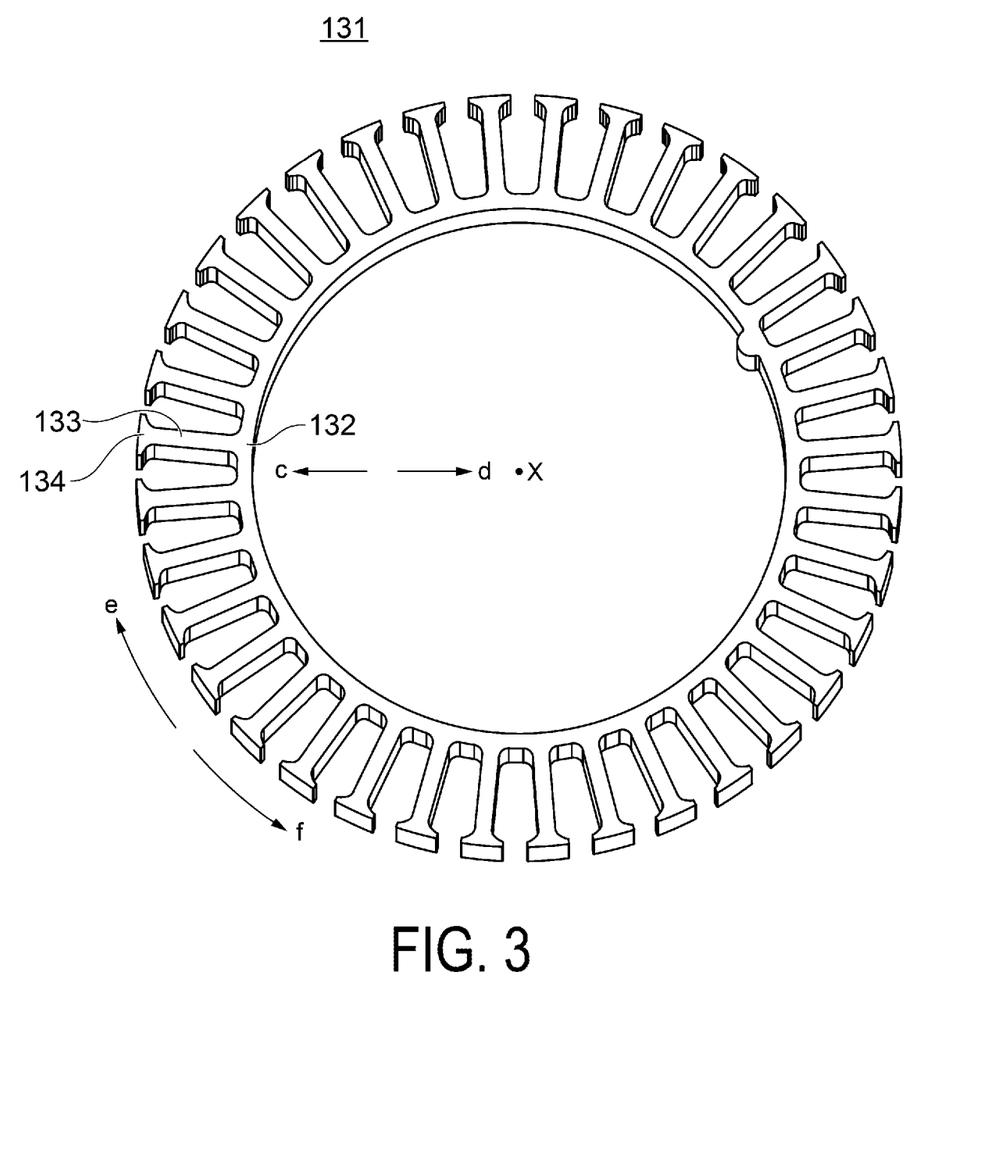
FIG. 3 is a perspective view illustrating an overall configuration of a stator core of the motor according to one embodiment of the present invention.
Figure 4:
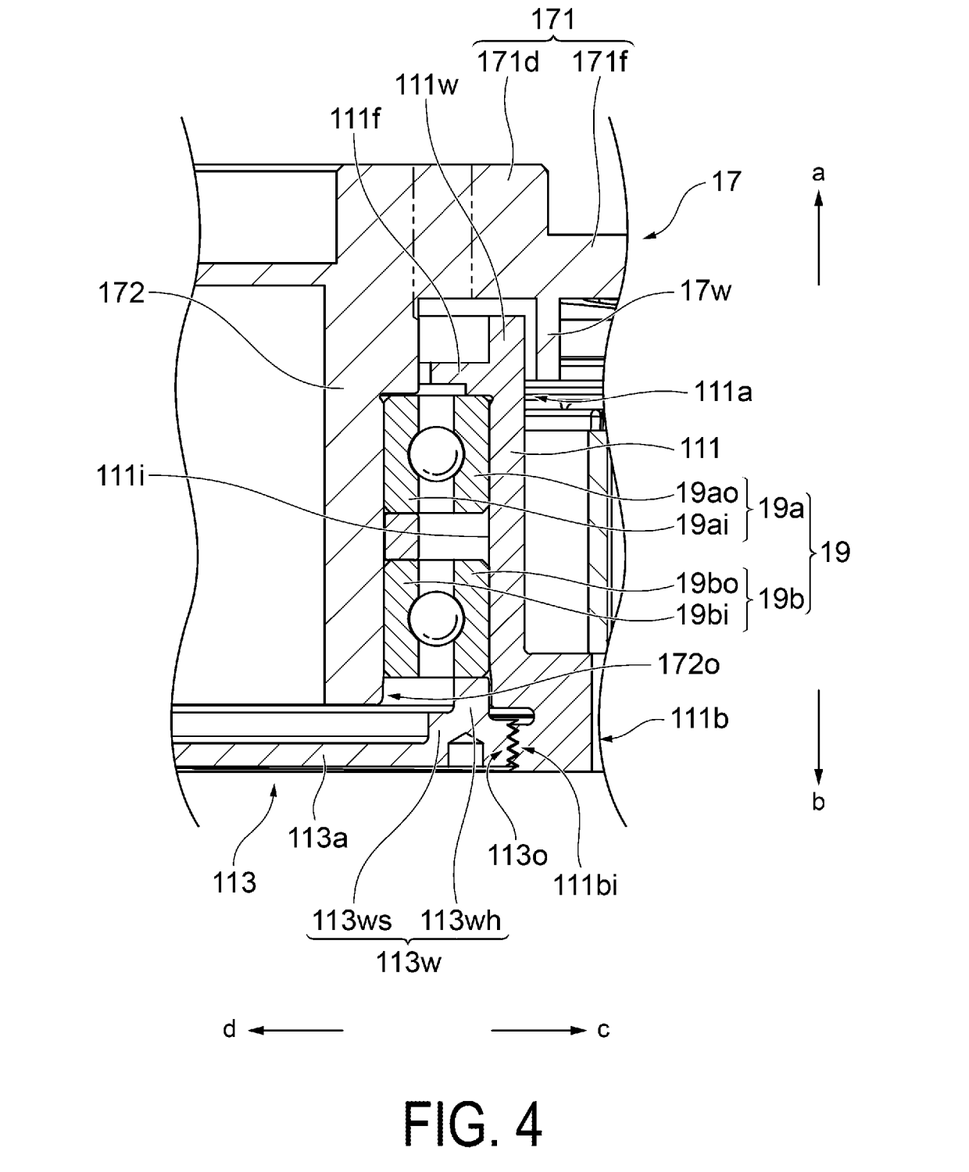
FIG. 4 is a partial cross-sectional view illustrating a labyrinth structure of the motor according to one embodiment of the present invention.

Next, embodiments of the present invention will be described with reference to the drawings. FIG. 1 is a perspective view illustrating an overall configuration of an outer rotor-type motor according to one embodiment of the present invention. FIG. 2 is a cross-sectional perspective view of the motor according to one embodiment of the present invention. FIG. 3 is a perspective view illustrating an overall configuration of a stator core of the motor according to one embodiment of the present invention. FIG. 4 is a partial cross-sectional view illustrating a labyrinth structure of the motor according to one embodiment of the present invention.

Note that, in the description of the present embodiment, for the sake of convenience, an extending direction of an axial line X when a motor 1 rotates is defined as a rotating shaft direction in the following description. Further, for the sake of convenience, in the rotating shaft direction, an arrow a direction is defined as an upper side, and an arrow b direction is defined as a lower side in the following description. In a radial direction perpendicular to the axial line X, an arrow c direction away from the axial line X is defined as an outer peripheral side, and an arrow d direction approaching the axial line X is defined as an inner peripheral side. In a peripheral direction of the motor 1, an arrow e direction is defined as a clockwise direction, and an arrow f direction is defined as a counterclockwise direction. In the following description, the upper side (the arrow a direction) and the lower side (the arrow b direction) refer to an up and down relationship of the motor 1 in the drawings, and do not necessarily correspond to an up and down relationship in a gravitational direction.

As illustrated in FIGS. 1 to 4, the motor 1 is an outer rotor-type brushless motor installed on a floating-type mobile body such as a drone (not illustrated), for example.

In the motor 1, a propeller (not illustrated) of a drone is attached to a holder 17 (FIG. 1) at the upper side (the arrow a direction), and an airframe of the drone is attached to a stator holder 11 (FIG. 2) at the lower side (the arrow b direction). As illustrated in FIG. 2, the motor 1 mainly includes the stator holder 11, a stator 13, a rotor 15, the holder 17, and a bearing 19.

The stator holder 11 includes a bearing holder 111, the bearing holder 111 being an inner peripheral portion having a cylindrical shape; an outer peripheral portion 112 having a cylindrical shape; a lid 113; and a coupling portion 115. The bearing holder 111 is formed in a substantially cylindrical shape extending in the rotating shaft direction. The bearing holder 111 accommodates the bearing 19 at a surface at the inner peripheral side (the arrow d direction) (hereinafter referred to as an "inner peripheral surface").

Specifically, the bearing holder 111 holds a bearing 19a at one end portion 111a side (the arrow a direction) in the rotating shaft direction, and holds a bearing 19b at another end portion 111b side (the arrow b direction). In this case, an outer ring 19ao of the bearing 19a and an outer ring 19bo of the bearing 19b are press-fitted against an inner peripheral surface 111i of the bearing holder 111.

The bearings 19a and 19b are, for example, ball bearings. However, the bearings 19a and 19b are not limited to this, and other various bearings such as sleeve bearings, for example, may be used.

As illustrated in FIG. 4, the bearing holder 111 includes a flange portion 111f and a wall portion 111w at one end portion 111a. The flange portion 111f is formed in an annular shape or a substantially annular shape protruding to the inner peripheral side (the arrow d direction) in the radial direction. The flange portion 111f urges the outer ring 19ao of the bearing 19a toward the lower side (the arrow b direction) in the rotating shaft direction. In the radial direction, a gap is formed between the flange portion 111f and a rotating shaft 172 described below.

The wall portion 111w of the bearing holder 111 is formed in a cylindrical shape or a substantially cylindrical shape protruding toward an inner peripheral portion 171 of the holder 17 described below in the rotating shaft direction. The wall portion 111w is formed so as to be coaxial with and to have the same diameter as the bearing holder 111. In the radial direction, the wall portion 111w is located inside a wall portion 17w of the holder 17 described below, and opposes the wall portion 17w. A gap is formed between the wall portion 111w and the holder 17 described below in the rotating shaft direction and the radial direction.

The other end portion 111b of the bearing holder 111 includes an inner peripheral surface 111bi at the inner peripheral side (the arrow d direction) in the radial direction. A helical groove (hereinafter referred to as a female thread groove) is formed at the inner peripheral surface 111bi, and is screwed onto a helical groove (hereinafter referred to as a male thread groove) formed at an outer peripheral surface 113o of the lid 113 described below.

The outer peripheral portion 112 of the stator holder 11 is formed in a cylindrical shape or a substantially cylindrical shape extending in the rotating shaft direction. Both of the bearing holder 111 and the outer peripheral portion 112 include the axial line X as a center axis. The length of the outer peripheral portion 112 in the rotating shaft direction is shorter than the length of the bearing holder 111 in the rotating shaft direction.

The coupling portion 115 is integrally formed with the bearing holder 111 and the outer peripheral portion 112, between the bearing holder 111 and the outer peripheral portion 112 of the stator holder 11. The coupling portion 115 couples the bearing holder 111 and the outer peripheral portion 112 to each other.

The coupling portion 115 extends from an end portion of the bearing holder 111 at the outer peripheral side toward the outer peripheral side (the arrow c direction), and is connected to an end portion of the outer peripheral portion 112 at the inner peripheral side.

As illustrated in FIGS. 2 and 4, the lid 113 is disposed at the other end portion 111b side of the bearing holder 111 in the rotating shaft direction. The lid 113 is formed of an aluminum alloy, and has a disk shape as a whole. However, the present invention is not limited to this configuration, and the lid 113 may be formed of another material such as a resin or a plastic.

The lid 113 includes a bottom portion 113a and a wall portion 113w. The bottom portion 113a is formed in a disk shape or a substantially disk-like shape. The lid 113 includes the outer peripheral surface 113o at the outer peripheral side (the arrow c direction) of the bottom portion 113a in the radial direction. At the outer peripheral surface 113o, the male thread groove is formed and screwed into the female thread groove formed at the inner peripheral surface 111bi of the other end portion 111b of the bearing holder 111.

The wall portion 113w of the lid 113 protrudes from the bottom portion 113a to the bearing 19 side (the upper side (the arrow a direction)) in the rotating shaft direction, and is formed in a substantially cylindrical shape. The wall portion 113w of the lid 113 includes an outer peripheral portion 113wh, and a step portion 113ws forming a plane higher than a part of the wall portion 113w. The outer peripheral portion 113wh and the step portion 113ws are formed in a cylindrical shape or a substantially cylindrical shape protruding from the bottom portion 113a toward the bearing 19 side (the upper side (the arrow a direction)) in the rotating shaft direction.

The step portion 113ws is connected to a surface of the outer peripheral portion 113wh at the inner peripheral side (the arrow d direction) in the radial direction, and has a length protruding in the rotating shaft direction shorter than the length of the outer peripheral portion 113wh. In the rotating shaft direction, a surface of the step portion 113ws opposing the bearing 19b is located closer to the bottom portion 113a side (the arrow b direction) than a surface of the rotating shaft 172 described below opposing the bottom portion 113a. Further, in the radial direction, an inner peripheral surface of the step portion 113ws is located closer to the outside (the arrow c direction) than an inner ring 19ai of the bearing 19a and an inner ring 19bi of the bearing 19b.

In the radial direction, the wall portion 113w of the lid 113 is formed outside (the arrow c direction) the rotating shaft 172 described below. In the radial direction, the wall portion 113w of the lid 113 opposes an outer peripheral surface 172o of the rotating shaft 172 described below. A gap is formed between the lid 113 and the rotating shaft 172 described below. The wall portion 113w (specifically, the outer peripheral portion 113wh) of the lid 113 urges the bearing 19b to the upper side (the arrow a direction) in the rotating shaft direction.

A stator core 131 of the stator 13 is fixed to a surface of the outer peripheral portion 112 at the outer peripheral side (hereinafter referred to as an outer peripheral surface). The stator 13 includes the stator core 131, an insulator 135, and a coil 139.

The stator core 131 (FIG. 3) is a laminated body of silicon steel plates or the like as a magnetic body, and includes an annular portion 132, a plurality of tooth portions 133 extending from the annular portion 132 to the outer peripheral side (the arrow c direction side), and a magnetic pole portion 134 as an outer peripheral end of each of the tooth portions. In other words, a part of the stator core extending in the radial direction is located between the annular portion 132 and the magnetic pole portion 134.

An inner peripheral surface of the annular portion 132 of the stator core 131 is fixed to the outer peripheral surface of the outer peripheral portion 112 of the stator holder 11. Further, the magnetic pole portion 134 of the stator core 131 protrudes in the clockwise direction (the arrow e direction) and the counterclockwise direction (the arrow f direction) in the peripheral direction, and a gap between adjacent magnetic pole portions 134 is smaller than a gap (a slot) between adjacent tooth portions 133.

The insulator 135 formed of an insulating member is mounted at the tooth portion 133 of the stator core 131. The coil 139 is wound around the tooth portion 133 via the insulator 135. The tooth portion 133 of the stator core 131 and the coil 139 are electrically insulated via the insulator 135.

The rotor 15 (FIG. 2) includes a yoke 151 and a magnet 153. The yoke 151 is an iron core having an annular shape and a cylindrical shape extending in the rotating shaft direction. The yoke 151 integrally holds the magnet 153 in a state where the magnet 153 is surrounded. The yoke 151 prevents leakage of a magnetic field of the magnet 153, and is formed of a magnetic body such as an iron core.

The holder 17 is disposed at the one end portion 111a side of the bearing holder 111 in the rotating shaft direction. The holder 17 is formed of an aluminum alloy, the aluminum alloy being a metal, and has a disk shape on the whole. However, the present invention is not limited to this configuration, and the holder 17 may be formed of another material such as a resin or a plastic. The holder 17 is formed with high accuracy by cutting of cutting processing. However, the present invention is not limited to this configuration, and the holder 17 may be formed by press molding and the like.

As illustrated in FIGS. 1 and 2, the holder 17 includes the inner peripheral portion 171 provided at the inner peripheral side (the arrow d direction), an outer peripheral portion 173 provided at an end portion of the outer peripheral side (the arrow c direction), a spoke 175, and the wall portion 17w.

The inner peripheral portion 171 of the holder 17 includes a columnar protruding portion 171d provided with a circular recess portion 171h with the axial line X as the center, and a flange portion 171f extending from an end portion of the protruding portion 171d at the outer peripheral side in the radial direction. The flange portion 171f has a size capable of covering the bearing holder 111 from the upper side (the arrow a direction).

The protruding portion 171d of the inner peripheral portion 171 includes the rotating shaft 172 in a substantially cylindrical shape extending in an up and down direction (the arrow ab direction) with the axial line X as the center. The inside of the rotating shaft 172 and the recess portion 171h are blocked. The inner ring 19ai of the bearing 19a and the inner ring 19bi of the bearing 19b are held at the outer peripheral surface of the rotating shaft 172. In the present embodiment, the rotating shaft 172 is integrally formed as a part of the holder 17, and thus the inner peripheral portion 171 of the holder 17 is fixed to the rotating shaft 172.

The rotating shaft 172 protrudes closer to the lid 113 side (the lower side (the arrow b direction)) than an end surface of the bearing 19b opposing the lid 113 in the rotating shaft direction. The outer peripheral surface 172o of the rotating shaft 172 opposes the wall portion 113w of the lid 113 in the radial direction.

A plurality of (for example, six) the spokes 175 are connected to the end portion of the flange portion 171f at the outer peripheral side (the arrow c direction), and the annular outer peripheral portion 173 is connected to a tip portion of the spoke 175 at the outer peripheral side (the arrow c direction) in the radial direction. In other words, the spoke 175 connects the flange portion 171f of the inner peripheral portion 171 and the outer peripheral portion 173.

The outer peripheral portion 173 of the holder 17 is fixed to the yoke 151 of the rotor 15. The holder 17 and the rotor 15 integrally rotate about the axial line X. In the present embodiment, an outer surface of the outer peripheral portion 173 of the holder 17 fits with an inner surface of the yoke 151 of the rotor 15, and an end portion of the yoke 151 of the rotor 15 at the holder 17 side and the outer surface of the outer peripheral portion 173 of the holder 17 engage with each other, and thus the outer peripheral portion 173 of the holder 17 is fixed to the yoke 151 of the rotor 15. However, the present invention is not limited to this configuration, and the outer peripheral portion 173 of the holder 17 may be fixed to the yoke 151 of the rotor 15 by press fitting, bonding, or both.

As illustrated in FIG. 4, the wall portion 17w of the holder 17 is formed in a tubular shape protruding from the inner peripheral portion 171 of the holder 17 toward the bearing holder 111 side (the arrow b direction) in the rotating shaft direction. The wall portion 17w of the holder 17 is formed outside (the arrow c direction) the wall portion 111w of the bearing holder 111 in the radial direction. The wall portion 17w of the holder 17 is formed closer to the inside (the arrow d direction) than a part of the spoke 175 in the radial direction. The wall portion 17w of the holder 17 opposes the wall portion 111w of the bearing holder 111 in the radial direction. In the radial direction, a gap is formed between the wall portion 17w of the holder 17 and the wall portion 111w of the bearing holder 111.

As illustrated in FIG. 4, the bearing 19a and the bearing 19b are fixed by the bearing holder 111, the lid 113, and the rotating shaft 172. A labyrinth structure is formed of the one end portion 111a of the bearing holder 111 and the inner peripheral portion 171 of the holder 17 near the bearing 19a. Specifically, the gap formed between the flange portion 111f of the bearing holder 111 and the rotating shaft 172 in the radial direction, and the gap formed between the wall portion 111w of the bearing holder 111 and the holder 17 in the rotating shaft direction and the radial direction communicate with each other to form a plurality of bent paths communicating with the bearing 19a.

Further, the labyrinth structure is formed of the rotating shaft 172 and the lid 113 near the bearing 19b. Specifically, a gap formed between the bottom portion 113a of the lid 113 and the rotating shaft 172 in the rotating shaft direction, and a gap formed between the wall portion 113w of the lid 113 and the rotating shaft 172 in the radial direction communicate with each other to form a plurality of bent paths communicating with the bearing 19b.

With the configuration described above, the motor 1 can suppress entry of dust to the bearing 19a due to the labyrinth structure formed of the one end portion 111a of the bearing holder 111 and the inner peripheral portion 171 of the holder 17. Specifically, in order for dust to reach the bearing 19a, the dust needs to pass through the plurality of bent paths formed of the flange portion 111f and the wall portion 111w of the bearing holder 111, the inner peripheral portion 171 and the wall portion 17w of the holder 17, and the rotating shaft 172, and thus it is difficult for the dust to eventually reach the bearing 19a.

Further, the motor 1 can suppress entry of dust to the bearing 19b due to the labyrinth structure formed of the rotating shaft 172 and the lid 113. Specifically, in order for dust to reach the bearing 19b, the dust needs to pass through the plurality of bent paths formed of the rotating shaft 172, and the bottom portion 113a and the wall portion 113w of the lid 113, and thus it is difficult for the dust to eventually reach the bearing 19b.

Note that, since it is difficult for dust to enter due to the labyrinth structure formed of the bearing holder 111, the holder 17, the rotating shaft 172, and the lid 113, a dustproof cover and the like do not need to be separately used in the motor 1. Thus, dust resistance of the motor can be improved while suppressing a cost increase and a weight increase due to an increase in the number of components.

Note that the motor 1 according to the present embodiment is configured as an outer rotor-type brushless motor, but the present invention can also be applied to a motor other than a brushless motor. Further, the present invention can also be applied to an inner rotor-type motor.

As described above, the motor according to the present invention has been described with reference to a preferred embodiment, but the motor according to the present invention is not limited to the configuration of the embodiment described above. For example, in the present embodiment, a case where the labyrinth structure is formed of the one end portion 111a of the bearing holder 111 and the inner peripheral portion 171 of the holder 17, and the labyrinth structure is formed of the rotating shaft 172 and the lid 113 has been described, but the present invention is not limited to this case. The labyrinth structure may be formed only by the one end portion 111a of the bearing holder 111 and the inner peripheral portion 171 of the holder 17.

Further, the labyrinth structure may be formed only by the rotating shaft 172 and the lid 113.

In the present embodiment, a case where the inside of the rotating shaft 172 and the recess portion 171h are blocked has been described, but the present invention is not limited to the case. The inside of the rotating shaft and the recess portion may communicate with each other to form a through hole.

In the present embodiment, a case where the bottom portion 113a of the lid 113 is formed in a disk shape or a substantially disk-like shape has been described, but the present invention is not limited to this case. A protruding portion protruding to the inside of the rotating shaft may be formed at the bottom portion of the lid.

In the present embodiment, a case where one wall portion 111w of the bearing holder 111 and one wall portion 17w of the holder 17 are formed has been described, but the present invention is not limited to this case. Any one or both of a plurality of the wall portions of the bearing holder and a plurality of the wall portions of the holder may be formed.

In the present embodiment, a case where the inner peripheral portion 171 of the holder 17 includes the columnar protruding portion 171d has been described, but the present invention is not limited to the case. As in another embodiment (a modification example) illustrated in FIG. 5, an inner peripheral portion 271 of a holder 27 may have a flat shape without a columnar protruding portion.

In the present embodiment, a case where the rotating shaft 172 is integrally formed as a part of the holder 17 has been described, but the present invention is not limited to this case. As in the other embodiment (the modification example) illustrated in FIG. 5, a rotating shaft 272 and the holder 27 may be formed as different members, and may be fixed to each other by press fitting, bonding, or both.

In the present embodiment, a case where the wall portion 111w of the bearing holder 111 is formed so as to be coaxial with and to have the same diameter as the bearing holder 111 has been described, but the present invention is not limited to this case. The wall portion of the bearing holder need not be formed so as to have the same diameter as the bearing holder. For example, as in the other embodiment (the modification example) illustrated in FIG. 5, a wall portion 211w of a bearing holder 211 may be formed at an end portion of a flange portion 211f at the inner peripheral side (the arrow d direction). In this case, as illustrated in FIG. 5, a wall portion 27w of the holder 27 may be formed so as to oppose the flange portion 211f in the rotating shaft direction.

In the present embodiment, a case where, in the rotating shaft direction, the surface of the step portion 113ws of the wall portion 113w of the lid 113 opposing the bearing 19b is located closer to the bottom portion 113a side (the arrow b direction) than the surface of the rotating shaft 172 opposing the bottom portion 113a has been described, but the present invention is not limited to this case. As in the other embodiment (the modification example) illustrated in FIG. 5, in the rotating shaft direction, a surface of a step portion 213ws of a wall portion 213w of a lid 213 opposing a bearing 19b may be located closer to a holder 27 side (the arrow a direction) than a surface of the rotating shaft 272 opposing a bottom portion 213a.

In the present embodiment, a case where, in the radial direction, the inner peripheral surface of the step portion 113ws of the wall portion 113w of the lid 113 is located closer to the outside (the arrow c direction) than the inner ring 19ai of the bearing 19a and the inner ring 19bi of the bearing 19b has been described, but the present invention is not limited to this case. As in the other embodiment (the modification example) illustrated in FIG. 5, in the rotating shaft direction, the surface of the step portion 213ws of the wall portion 213w of the lid 213 opposing the bearing 19b may oppose an inner ring 19bi of the bearing 19b.

Figure 5:
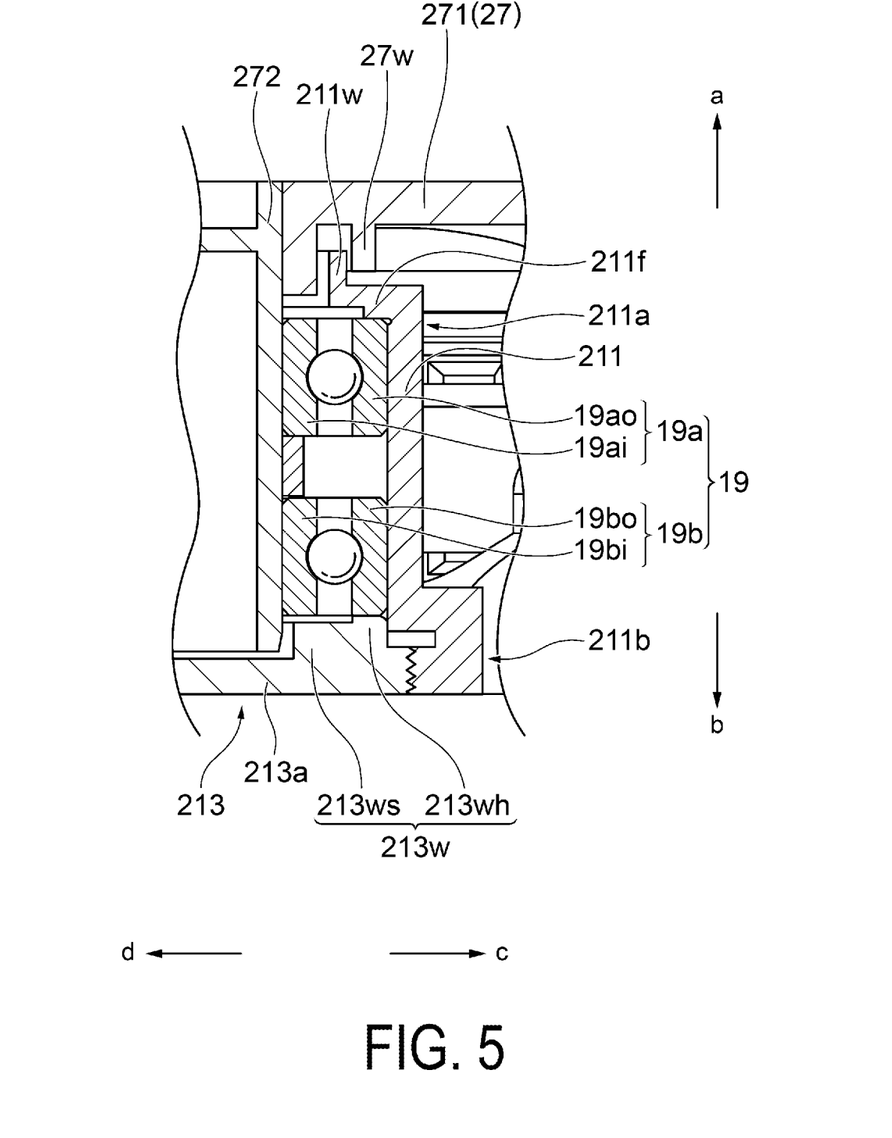
FIG. 5 is a partial cross-sectional view of a labyrinth structure of a motor according to another embodiment of the present invention.

Note that, in the other embodiment (the modification example) illustrated in FIG. 5, a bearing 19a and the bearing 19b are fixed by the bearing holder 211, the lid 213, and the rotating shaft 272.

A labyrinth structure is formed of one end portion 211a of the bearing holder 211 and the inner peripheral portion 271 of the holder 27 near the bearing 19a. The labyrinth structure can suppress entry of dust to the bearing 19a. Specifically, a gap formed between the wall portion 211w of the bearing holder 211 and the inner peripheral portion 271 of the holder 27 in the rotating shaft direction and the radial direction, a gap formed between the wall portion 211w of the bearing holder 211 and the wall portion 27w of the holder 27 in the radial direction, and a gap formed between the flange portion 211f of the bearing holder 211 and the wall portion 27w of the holder 27 in the rotating shaft direction communicate with each other to form a plurality of bent paths communicating with the bearing 19a. In order for dust to reach the bearing 19a, the dust needs to pass through the path, and thus it is difficult for the dust to eventually reach the bearing 19a.

Further, a labyrinth structure is formed of the rotating shaft 272 and the lid 213 near the bearing 19b. The labyrinth structure can suppress entry of dust to the bearing 19b. Specifically, a gap formed between the bottom portion 213a of the lid 213 and the rotating shaft 272 in the rotating shaft direction, and a gap formed between the wall portion 213w of the lid 213 and the rotating shaft 272 in the radial direction communicate with each other to form a plurality of bent paths communicating with the bearing 19b. In order for dust to reach the bearing 19b, the dust needs to pass through the path, and thus it is difficult for the dust to eventually reach the bearing 19b.

In addition, the motor according to the present invention may be appropriately modified by a person skilled in the art according to conventionally known knowledge. Such modifications are of course included in the scope of the present invention as long as these modifications still include the configuration of the present invention.

REFERENCE SIGNS LIST

1 Motor
11 Stator holder
13 Stator
15 Rotor
17 Holder
17w Wall portion
19 (19a, 19b) Bearing
111 Bearing holder
111a One end portion
111b Another end portion
111bi Inner peripheral surface
111f Flange portion
111w Wall portion
112 Outer peripheral portion
113 Lid
113a Bottom portion
113o Outer peripheral surface
113w Wall portion
113ws Step portion
113wh Outer peripheral portion
115 Coupling portion
131 Stator core
132 Annular portion
133 Tooth portion
135 Insulator
139 Coil
151 Yoke
153 Magnet
171 Inner peripheral portion
171d Protruding portion
171f Flange portion
171h Recess portion
172 Rotating shaft
173 Outer peripheral portion
175 Spoke
27 Holder
27w Wall portion
211 Bearing holder
211f Flange portion
211w Wall portion
213 Lid
213a Bottom portion
213w Wall portion
213ws Step portion
213wh Outer peripheral portion
271 Inner peripheral portion
272 Rotating shaft

The invention claimed is:

1. A motor, comprising:
a rotating shaft;
a bearing;
a bearing holder configured to accommodate the bearing, the bearing holder including an one end portion and an other end portion; and
a holder disposed at one end portion side of the bearing holder in a rotating shaft direction; wherein
the holder includes an inner peripheral portion fixed to the rotating shaft and a wall portion protruding in the rotating shaft direction,
the one end portion of the bearing holder includes a wall portion protruding in the rotating shaft direction and a flange portion protruding in a radial direction,
the wall portion of the holder opposes the wall portion of the bearing holder in the radial direction,
a labyrinth structure is formed of the wall portion of the bearing holder, the flange portion of the bearing holder, the inner peripheral portion of the holder, and the wall portion of the holder,
the labyrinth structure includes a plurality of bent paths communicating with the bearing.

2. The motor according to claim 1, wherein
a gap is formed between the flange portion and the rotating shaft in the radial direction.

3. The motor according to claim 1, wherein
a gap is formed between the flange portion and the wall portion of the holder in the rotating shaft direction.

* * * * *